United States Patent
Viola

(10) Patent No.: US 6,863,614 B2
(45) Date of Patent: Mar. 8, 2005

(54) SHUNTED COLLARLESS TORSION SHAFT FOR ELECTRONIC POWER-ASSISTED STEERING SYSTEMS

(75) Inventor: Jeffrey Louis Viola, Berkley, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/428,052

(22) Filed: May 1, 2003

(65) Prior Publication Data

US 2004/0219984 A1 Nov. 4, 2004

(51) Int. Cl.$^7$ .................................................. G01L 3/10
(52) U.S. Cl. ..................... 464/23; 464/112; 73/862.333
(58) Field of Search .............................. 464/23, 29, 112, 464/119, 183; 73/862.333, DIG. 2; 324/207.21; 403/378; 180/443

(56) References Cited

U.S. PATENT DOCUMENTS

| | | | | |
|---|---|---|---|---|
| 1,612,321 A | * | 12/1926 | Soderberg | ................ 464/183 X |
| 3,648,483 A | * | 3/1972 | Garcia, Jr. | |
| 4,273,207 A | * | 6/1981 | Sivers et al. | ............ 464/183 X |
| 4,704,918 A | * | 11/1987 | Orkin et al. | ............ 464/183 X |
| 4,791,269 A | * | 12/1988 | McLean et al. | |
| 5,009,110 A | * | 4/1991 | Lang et al. | |
| 5,052,232 A | | 10/1991 | Garshelis | ................. 73/862.36 |
| 5,907,105 A | * | 5/1999 | Pinkerton et al. | |
| 6,047,605 A | | 4/2000 | Garshelis | ............... 73/862.336 |
| 6,260,423 B1 | | 7/2001 | Garshelis | ............... 73/862.336 |
| 6,360,841 B1 | * | 3/2002 | Blandino et al. | ........... 180/443 |
| 6,520,274 B1 | * | 2/2003 | McElmeel et al. | ...... 180/443 X |
| 2002/0198075 A1 | * | 12/2002 | Prucher | |

OTHER PUBLICATIONS

I.J. Garshelis et al, *A Torque Transducer Based on Local Bands of Naturally Stabilized Remanent Circumferential Magnetization*, Journal of Applied Physics, 85:5468–70 (1999).

* cited by examiner

*Primary Examiner*—Greg Binda
(74) *Attorney, Agent, or Firm*—Brinks Hofer Gilson & Lione

(57) ABSTRACT

A torsion shaft for a vehicle includes an elongated inner shaft, and an outer sleeve attached to the inner shaft which fits over the inner shaft. A torsion cap is further attached to the inner shaft and outer sleeve. Another embodiment of the present invention includes an elongated inner shaft and an outer casing attached to the inner shaft which fits over the inner shaft. A torsion cap is further attached to the inner shaft and outer sleeve. A method for making a torsion shaft is also provided. An inner shaft and a magnetized outer sleeve are provided. The inner shaft is inserted into the outer sleeve, and the two are joined together.

10 Claims, 3 Drawing Sheets

SHUNTED COLLARLESS TORSION SHAFT FOR ELECTRONIC POWER-ASSISTED STEERING SYSTEMS

BACKGROUND OF THE INVENTION

In control of systems having rotating drive shafts, such as an electronic power-assisted steering system ("EPAS system"), the amount of torque applied to the drive shaft is an important parameter for control feedback. Therefore, the sensing and measurement of torque in an accurate, reliable and inexpensive manner has been a primary objective. For this purpose, non-contacting magnetoelastic torque transducers have been developed.

These non-contact torque sensors, as shown in U.S. Pat. No. 4,896,544, disclose a sensor comprising a torque carrying member, with an appropriately ferromagnetic and magnetoelastic surface, two axially distinct circumferential bands within the member that are endowed with respectively symmetrical, helically directed residual stress induced magnetic anisotropy, and a magnetic discriminator device for detecting, without contacting the torqued member, differences in the response of the two bands to equal, axial magnetizing forces. Most typically, magnetization and sensing are accomplished by providing a pair of excitation or magnetizing coils overlying and surrounding the bands, with the coils connected in series and driven by alternating current. Torque is sensed using a pair of oppositely connected sensing coils for measuring a difference signal resulting from the fluxes of the two bands. Unfortunately, providing sufficient space for the requisite excitation and sensing coils on and around the device on which the sensor is used has created practical problems in applications where space is at a premium. Also, such sensors appear to be impractically expensive for use on highly cost-competitive devices, such as in automotive applications.

More recently, torque transducers have been developed based on the principle of measuring the field arising from the torque induced tilting of initially circumferential remanent magnetizations. These transducers utilize a thin wall ring or collar serving as the field generating element. Tensile "hoop" stress in the ring, associated with the means of its attachment to the shaft carrying the torque being measured, establishes a dominant, circumferentially directed, uniaxial anisotropy. Upon the application of torsional stress to the shaft, the magnetization reorients and becomes increasingly helical as torsional stress increases. The helical magnetization resulting from torsion has both a circumferential component and an axial component, the magnitude of the axial component depending entirely on the torsion. One or more magnetic field vector sensors sense the magnitude and polarity of the field arising, as a result of the applied torque, in the space about the transducer and provides a signal output reflecting the signed magnitude of the torque. The stability of the "torque-to-field" transfer function of the transducer under rigorous conditions of use reflects the efficiency of uniaxial anisotropy in stabilizing circular polarizations. This anisotropy, together with the spatially closed nature of the quiescent polarization, is also the basis of an immunity from polarization loss in relatively large fields. While the fields that arise from the ring itself have only hard axis components relative to the anisotropy, "parasitic" fields from permeable material that is close enough to become magnetized by the ring field have no such limitation. The addition of such parasitic fields to the torque dependent field from the ring can seriously degrade the transfer function.

As a result, in order to avoid a major source of such distortion, either the underlying shaft, or a sleeve that is placed between the shaft and the ring, is generally fabricated from a paramagnetic material. In addition, inasmuch as the peak allowable torque in a ring sensor is limited by slippage at the ring/shaft interface, concerns have been expressed regarding distortion arising from slippage at the ring/shaft interface under conditions of torque overload. This need for multiple parts of different materials, together with the requirement that the methods and details of their assembly establish both a rigid, slip-free mechanical unit and a desired magnetic anisotropy, have encouraged the investigation of alternative constructions.

BRIEF SUMMARY OF THE INVENTION

According to one aspect of the present invention, there is provided a torsion shaft for a vehicle. This torsion shaft includes an elongated inner shaft, and an outer sleeve attached to the inner shaft which fits over the inner shaft. A torsion cap is further attached to the inner shaft and outer sleeve.

According to another aspect of the present invention, there is provided a torsion shaft for a vehicle. This torsion shaft includes an elongated inner shaft, and an outer casing attached over said inner shaft. A torsion cap is attached to the inner shaft and the outer casing.

According to yet another aspect of the present invention, there is provided a method of making a torsion shaft for a vehicle. An inner shaft and an outer sleeve are provided, and the outer sleeve is magnetized. The inner shaft is inserted into the outer sleeve, and the inner shaft and outer sleeve are joined together.

Other aspects of the present invention will become apparent in connection with the following description of the present invention.

DETAILED DESCRIPTION OF THE INVENTION

Figure 1A:
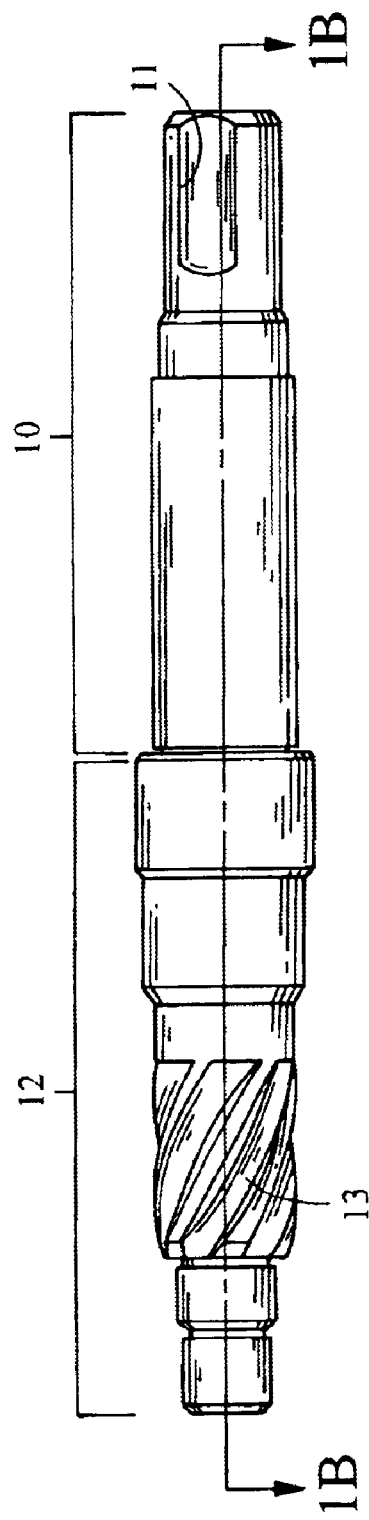
FIG. 1A is a diagram of the torsion shaft of an embodiment of the present invention.

FIG. 1A is a diagram of a torsion shaft of the present invention. A torsion cap 12 is attached to the assembled shaft 10 at one end. The assembled shaft 10 and torsion cap 12 may be of any shape, but are of the same outward shape to facilitate attachment, in one embodiment. For example, the shaft 10 and the torsion cap 12 are generally cylindrical. The torsion cap 12 may be attached to the assembled shaft 10 by any means now known or later developed. For example, the torsion cap 12 is attached to the assembled shaft 10 by inserting a pin in pinholes created in the assembled shaft 10 and torsion cap 12. The ends of the assembled shaft 10 and the torsion cap 12, as shown at 11 and 13 respectively, may be of any shape that will ensure a secure connection with other rotating parts in the vehicle. For example, the end pieces 11 and 13 may have grooves, as at 11, so as to slide into another receiving part, or may have threads, as at 13, so as to facilitate a connection with a gear or other rotating device. Other shapes now known or, later developed may be used.

Figure 1B:
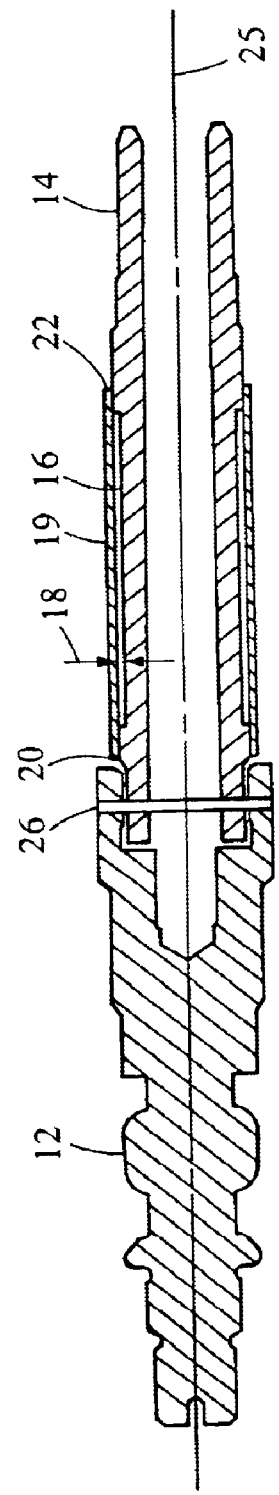
FIG. 1B is a cross-sectional diagram of the torsion shaft of an embodiment of the present invention, taken along the indicated plane of FIG. 1A.

FIG. 1B is a cross-section of FIG. 1A, taken along the indicated double-arrowed plane. From this cross-sectional view, the two layers of the assembled shaft 10 can be seen. The assembled shaft 10 comprises an inner shaft 14 and an outer sleeve 16.

The inner shaft 14 is made from any non-ferromagnetic metal. For example, the inner shaft 14 is made from a stainless steel. The inner shaft 14 may also be of any shape, such as a cylindrical shape. The inner shaft 14 may also be a solid shape or a hollow shape. The shape of the inner shaft 14 may be dictated by weight, material, or design concerns.

The outer sleeve 16 is made from any magnetoelastic metal, such as a T250 steel. The outer sleeve 16 may be of any shape, but is of the same shape as the inner shaft 14 in one embodiment, so that the outer sleeve 16 can easily fit over the inner shaft 14. For example, both the inner shaft 14 and outer sleeve 16 are cylindrical in shape. The outer sleeve 16 is no longer or larger than the inner shaft 14. For example, it is shorter than the inner shaft in one embodiment. The end 11 of the assembled shaft 10 is located on this inner shaft 14 for connection to rotating parts of the vehicle.

The radius of the outer sleeve 16 is at least as large as that of the inner shaft 14. The outer sleeve 16 thereby fits over the inner shaft 14. In one embodiment, the radius of the outer sleeve 16 is slightly larger than that of the inner shaft 14, so as to create a gap 18. For example, the gap 18 between the outer sleeve 16 and the inner shaft 14 is about 1 mm in a radial direction in one embodiment. Additionally, the inner shaft 14 may contain a radial groove 19 designed to help further define and deepen the gap 18.

In the assembled shaft 10, the outer sleeve 16 is attached to the inner shaft 14, such as by welding or other now known or later developed techniques. For example, a laser welding technique is used. The outer sleeve 16 may be welded to the inner shaft 14 at any desired point along the assembled shaft 10, or directly to the torsion cap 12. In one embodiment, the welding occurs at the first end 20 and second end 22 of the outer sleeve 16, while the remainder of the outer sleeve 16 is not welded. The gap 18 between the outer sleeve 16 and the inner shaft 14 may thereby be created and maintained.

The gap 18 improves fault detection. The outer sleeve 16 is designed to fail when a certain predetermined amount of torsion is placed on the assembled shaft 10. For example, the thickness of the outer sleeve 16, the metal used in making the outer sleeve 16, or the production parameters for the outer sleeve 16 is varied or selected for failure. The predetermined torsion level of failure may be set just below the failure torsion level for the inner shaft 14, at a critical torsion level to maintain system integrity, or at any other such warning level. Under this embodiment, the outer sleeve 16 fails when that predetermined torsion level is reached. The vehicle can then be shut down before higher torsion levels are attained, avoiding more severe damage to the inner shaft 14, the assembled shaft 10, or the vehicle.

Magnetic field sensors, such as Hall sensors or Flux Gate sensors, may be used to measure the magnetic field. Typically, these sensors are placed on the surface of the assembled shaft 10 or a short distance away. A magnetic field sensor may also be placed inside the assembled shaft 10.

Figure 2:
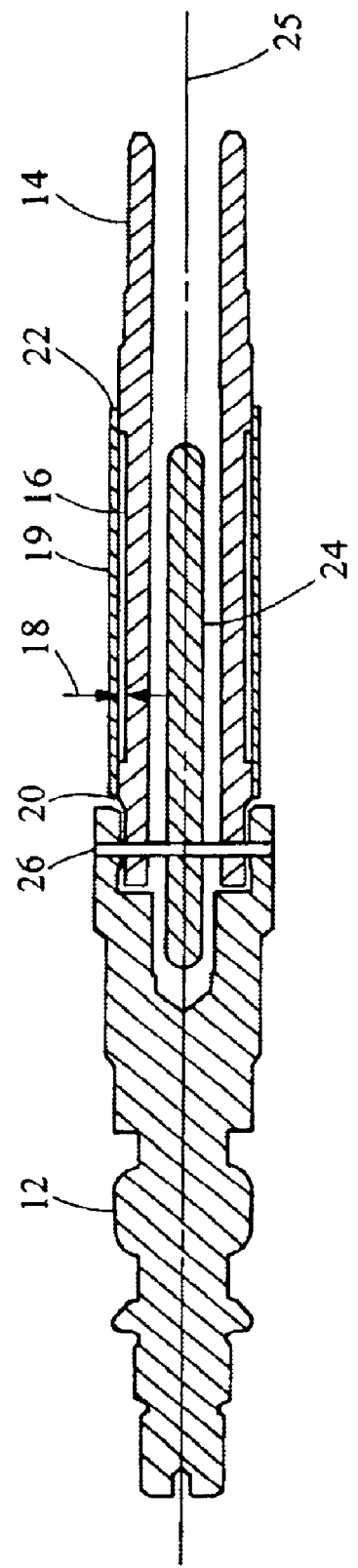
FIG. 2 is a cross-sectional diagram of the torsion shaft of an embodiment of the present invention containing an internal magnetic field sensor.

FIG. 2 shows an assembled shaft 10, of a hollow shape, which contains a magnetic field sensor 24. The magnetic field sensor 24 is positioned along a central axis 25 of the torsion shaft. The magnetic field sensor 24 may be attached within the assembled shaft 10 by any of various now known or later developed techniques. For example, a pin hole is created through the torsion cap 12, inner shaft 14, and magnetic field sensor 24, and a pin 26 is used to hold the components together.

Figure 3:
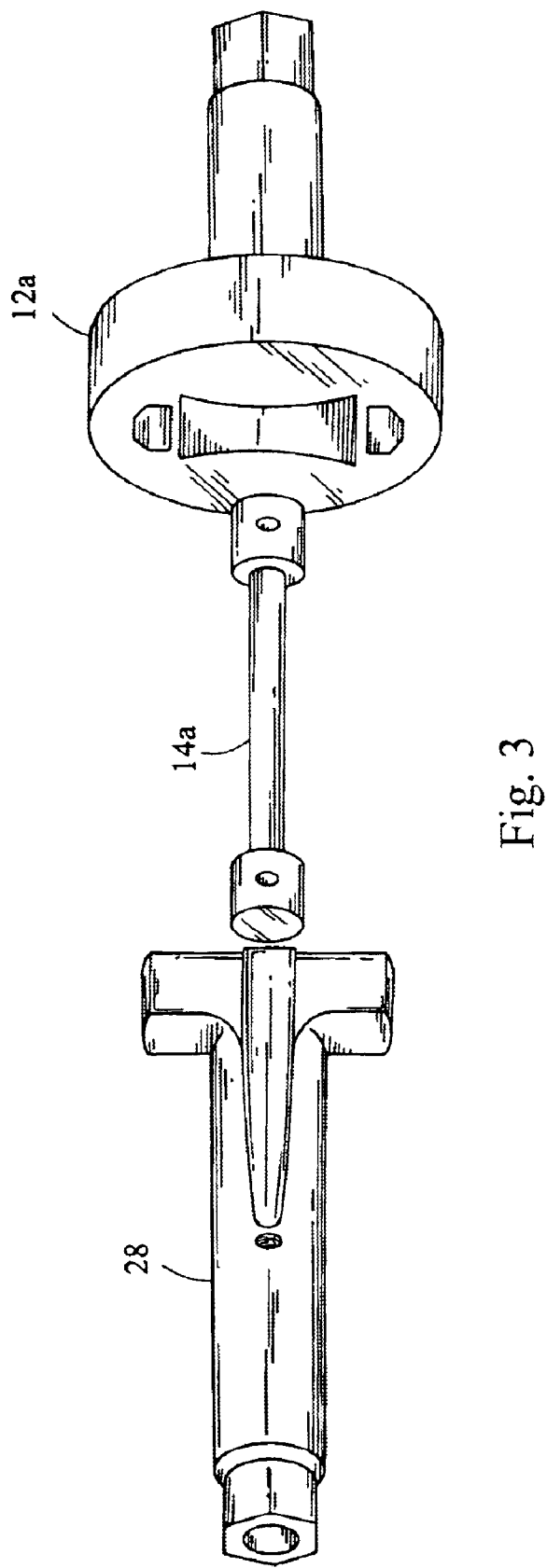
FIG. 3 is an exploded view of another embodiment of the torsion shaft of the present invention.

Another embodiment is shown in FIG. 3. FIG. 3 shows a three-part torsion shaft for use in an EPAS system. This three-part torsion shaft comprises an outer casing 26. This outer casing is hollow. The inner shaft 14a, here called an inner transducer shaft, is located within the outer casing 28. The inner shaft 14a may be connected to the outer casing 28 via welding, a pin through the outer casing 28, inner shaft 14a and the torsion cap 12a, or by any now known or later developed method. The inner shaft 14a is made of a magnetoelastic material, such as T250 steel. The outer casing 28 is made of non-ferromagnetic material, such as a stainless steel. In such an embodiment, the inner shaft 14a is a collar or collarless magnetoelastic transducer. The outer casing 28 is a magnetically transparent member, which engages with the torsion cap 12a at a predetermined angle re-directing or shunting the torsion load around inner shaft 14a.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A torsion shaft for a vehicle comprising:
  an elongated hollow inner shaft having longitudinally opposed ends, said ends being adapted to connect to rotating parts of the vehicle;
  a magnetic sensor located inside said inner shaft, said magnetic sensor attached to said inner shaft via a pin inserted through said inner shaft and said magnetic sensor;
  an outer sleeve having a first end and a second end longitudinally opposite said first end, said outer sleeve being attached to said inner shaft at said first and second ends of said outer sleeve; and
  a torsion cap attached to one of said ends of said inner shaft;
  said inner shaft having a failure torsion level and said outer sleeve being adapted to fail at a predetermined amount of torsion, less than said failure torsion level of said inner shaft.

2. The torsion shaft of claim 1 wherein said inner shaft and the outer sleeve are both cylindrical.

3. The torsion shaft of claim 1 wherein said inner shaft is made of a non-ferromagnetic material.

4. The torsion shaft of claim 3 wherein said inner shaft is made of stainless steel.

5. The-torsion shaft of claim 1 wherein said outer sleeve is made of a magnetoelastic material.

6. The torsion shaft of claim 1 wherein said first and second ends of said outer sleeve are welded to said inner shaft.

7. The torsion shaft of claim 6 wherein said first and second ends of said outer sleeve are laser welded to said inner shaft.

8. The torsion shaft of claim 1 wherein an annular groove within said inner shaft further defines a gap between said inner shaft and said outer sleeve, said gap positioned longitudinally between said first and second ends of said outer sleeve.

9. The torsion shaft of claim 8 wherein said gap is about 1 mm thick.

10. The torsion shaft of claim 1 wherein said magnetic sensor is located along about the central axis of said inner shaft.

* * * * *

UNITED STATES PATENT AND TRADEMARK OFFICE
CERTIFICATE OF CORRECTION

PATENT NO. : 6,863,614 B2
DATED : March 8, 2005
INVENTOR(S) : Jeffrey L. Viola

It is certified that error appears in the above-identified patent and that said Letters Patent is hereby corrected as shown below:

<u>Column 4,</u>
Line 47, delete "The-torsion" and substitute -- The torsion -- in its place.
Line 61, immediately after "claim 1" insert -- , -- (comma).

Signed and Sealed this

Eleventh Day of October , 2005

JON W. DUDAS
*Director of the United States Patent and Trademark Office*